No. 849,952. PATENTED APR. 9, 1907.
A. C. WILLIS.
AXLE NUT.
APPLICATION FILED MAR. 14, 1906.
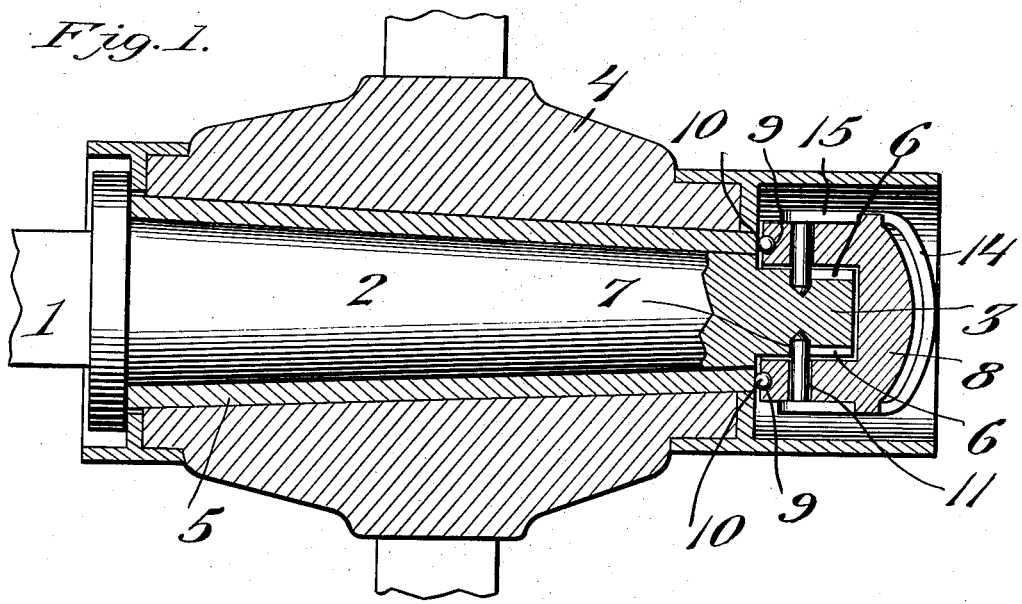
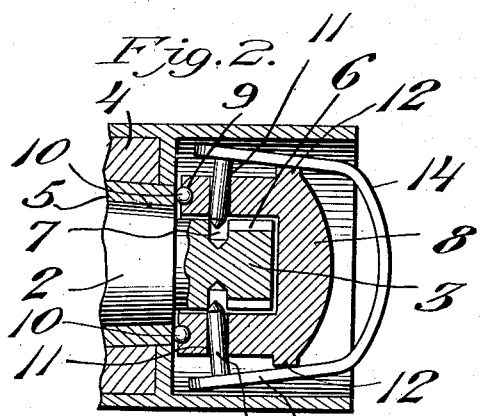
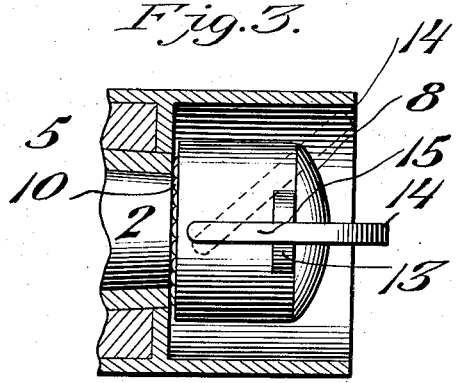
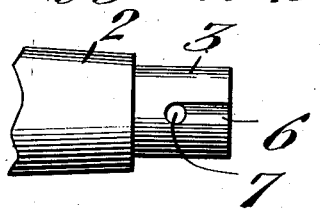
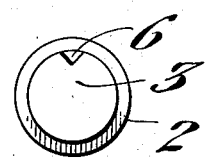
Witnesses
Edwin G. McKee
F. S. Elmore
Inventor
Alonzo C. Willis,
By Victor J. Evans
Attorney

UNITED STATES PATENT OFFICE.

ALONZO C. WILLIS, OF CONCORD, NEW HAMPSHIRE.

AXLE-NUT.

No. 849,952.　　　　Specification of Letters Patent.　　　　Patented April 9, 1907.

Application filed March 14, 1906. Serial No. 306,078.

*To all whom it may concern:*

Be it known that I, ALONZO C. WILLIS, a citizen of the United States, residing at Concord, in the county of Merrimac and State of New Hampshire, have invented certain new and useful Improvements in Axle-Nuts, of which the following is a specification.

This invention relates to axle-nuts of the type employed for retaining the wheel-hub upon the spindle, and has for its objects to produce a comparatively simple inexpensive device of this character which may be readily engaged with or disengaged from the end of the spindle, one whereby the formation of interengaging threads on the axle and nut for holding the latter in place is obviated, and one whereby tendency of the nut to escape from or become objectionably tight in practice is overcome.

A further object of the invention is to provide a device of this character embodying a spring-nut-retaining member having spindle-engaging portions adapted to securely engage and retain the nut upon the spindle, one wherein said engaging portions serve to guide the nut in the operations of applying or removing the same, and one in which the engagement or non-engagement of the member with the spindle may be quickly and conveniently effected.

With these and other objects in view the invention comprises the novel features of construction and combination of parts more fully hereinafter described.

In the accompanying drawings, Figure 1 is a central longitudinal section through a wheel-hub, showing the same mounted upon an axle-spindle and retained in place by a nut embodying the invention. Fig. 2 is a detail sectional view showing the nut-retaining member in released position. Fig. 3 is a detail view, partly in section, showing the parts illustrated in Fig. 2 and as viewed at right angles to said figure. Fig. 4 is a detail view of the end of the spindle. Fig. 5 is an end elevation of the same. Fig. 6 is an end view of the nut.

Referring to the drawings, 1 designates a vehicle-axle, having a spindle 2 provided at its outer end with a reduced nut-receiving portion 3, there being arranged for rotation on the spindle a wheel-hub 4, having an inner metal box 5, properly fitted on the spindle. These parts may all be of the usual or any preferred construction and material, except that the reduced nut-receiving portion 3 is provided with a pair of opposed longitudinally-extending grooves 6, terminating at their inner ends in transversely-disposed sockets or recesses 7, constituting seats for a purpose which will presently appear.

Formed to seat on the reduced portion 3 of the spindle and for holding the hub thereon is a nut 8, having at its inner end an annular groove or raceway 9 for the reception of anti-friction members or balls 10, arranged to bear on the adjacent end of the box and provided between its ends with a pair of diametrically-opposed transverse openings or perforations 11, adapted when the nut is in applied position to register, respectively, with the sockets or seats 7, there being formed at the outer end of the nut and in axial alinement with the openings 11 a pair of projecting cam members or portions 12, preferably of the form shown and having outer curved faces 13.

Applied to the nut 8 and for holding the same on the spindle is a retaining device comprising a substantially U-shaped spring locking member or bail 14, the normally parallel arms 15 of which are equipped adjacent their inner ends with inwardly-projecting engaging portions or fingers 16, movably disposed in the openings 11 and adapted to engage at their inner ends with the sockets or seats 7, the inner ends of the fingers 16 being shaped to conform to the grooves 6.

In practice when the nut is applied to the end of the spindle the locking member or bail 14 stands in the position indicated by dotted lines in Fig. 3, with the arms 15 in non-engagement with the cam-lugs 12 and the engaging fingers 16 seated at their inner ends in the sockets 7, as seen in Fig. 1. Under these conditions and when it is desired to remove the nut for permitting removal of the hub the bail 14 is turned laterally to the full-line position, (illustrated in Fig. 3,) whereupon the arms 15 ride upward on the cam-lugs 12, by which they are spread relatively for moving the inner ends of fingers 16 out of the socket 7, as seen in Fig. 2, whereby the nut may be readily removed from the spindle, it being noted in this connection that during the removal of the nut from or its application to the portion 3 the inner ends of the fingers 16 travel in the grooves 6 for properly guiding the nut and for insuring proper alinement of the openings 11 with the seats 7. It will be understood that after the nut has been properly seated on the end of the spindle the outer end of the bail 14 is swung laterally for carrying the arms 15 thereof out of engagement with the lugs 13, whereby the fingers 16 swing into engagement with the sockets 7.

Having thus described my invention, what I claim is—

1. A nut of the type described having a pair of transverse openings and provided with cam-lugs disposed remote from said openings, a spring locking member applied to the nut and provided with engaging portions movably disposed in said openings, and a nut-receiving element provided with transverse sockets to receive the inner ends of engaging portions, said locking members being arranged to ride onto the lugs for retracting the engaging portions from the sockets.

2. A nut of the type described having a transverse opening and provided with a cam-lug disposed remote from said opening, a spring locking member applied to the nut and having an arm adapted for movement over said lug, said arm being provided with an engaging portion movably disposed in said opening, and a nut-receiving element having a depression to receive the inner end of said engaging portion, the arm being adapted in riding onto the lug to retract the engaging portion from the depression.

3. A nut of the type described having a pair of transverse openings and provided with cam-lugs disposed remote from said openings, a substantially U-shaped spring locking member applied to the nut and presenting a pair of arms having inwardly-projecting engaging fingers movably disposed respectively in said openings, and a nut-receiving element having longitudinal grooves communicating at their inner ends with seats for the inner ends of said fingers, said arms being designed to ride onto the lugs for retracting the fingers from said seats.

In testimony whereof I affix my signature in presence of two witnesses.

ALONZO C. WILLIS.

Witnesses:
  E. FAGUE,
  A. A. EGE.